May 8, 1962 G. H. POLLARD ETAL 3,033,258
CAMERA CARRYING CASE
Filed Sept. 24, 1959 2 Sheets-Sheet 1
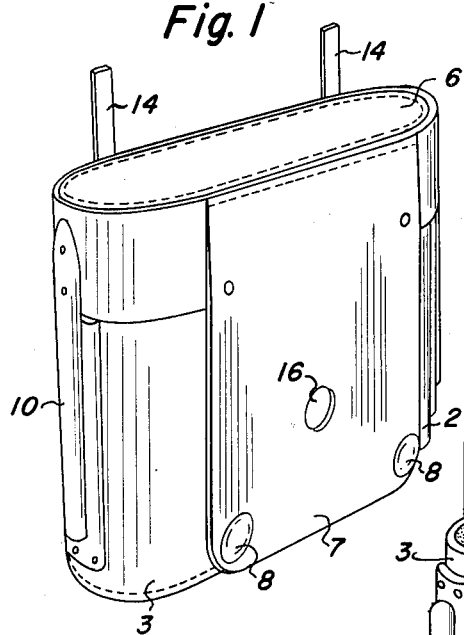
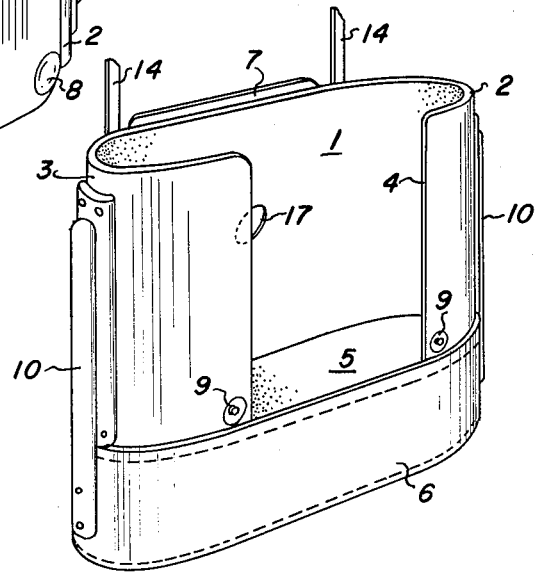
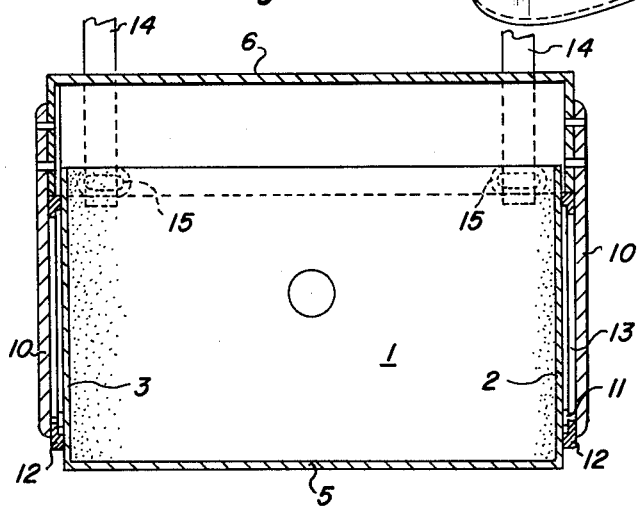
GRAHAM H. POLLARD
HAROLD A. DOHERTY
INVENTORS
BY
ATTORNEYS May 8, 1962 G. H. POLLARD ETAL 3,033,258
CAMERA CARRYING CASE
Filed Sept. 24, 1959 2 Sheets-Sheet 2
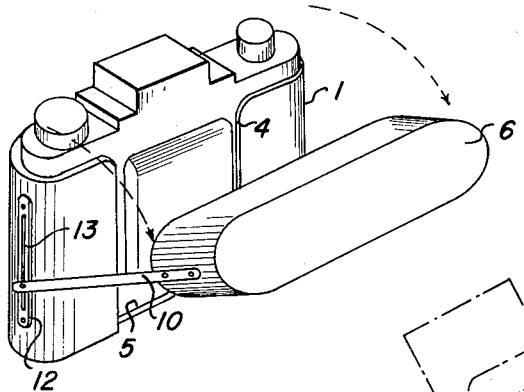
Fig. 4
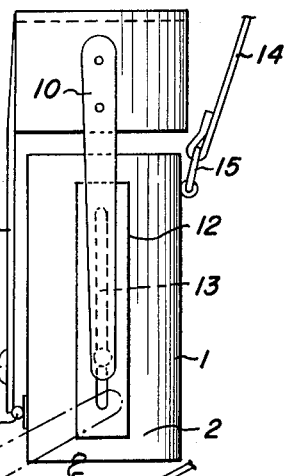
Fig. 6
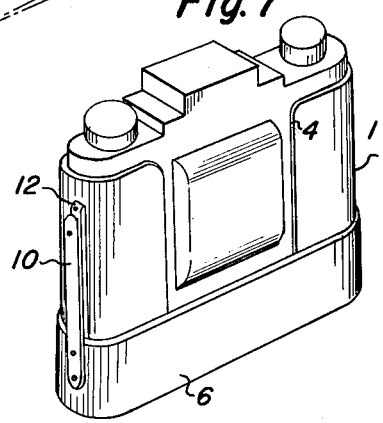
Fig. 7
Fig. 5
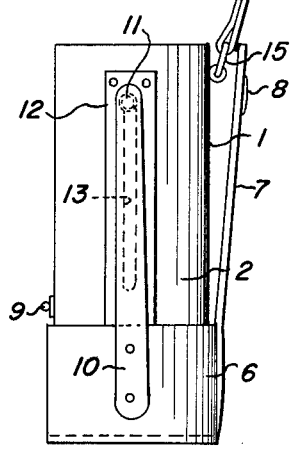
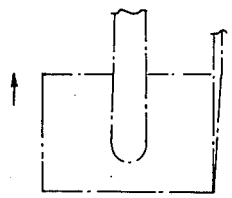
GRAHAM H. POLLARD
HAROLD A. DOHERTY
INVENTORS
BY *R. Frank Smith*
*Karl T. Loramore*
ATTORNEYS

3,033,258
CAMERA CARRYING CASE
Graham Helary Pollard, Wealdstone, and Harold Alfred
 Doherty, Hadley Wood Barnet, England, assignors to
 Eastman Kodak Company, Rochester, N.Y., a corporation of New Jersey
Filed Sept. 24, 1959, Ser. No. 842,045
Claims priority, application Great Britain Oct. 11, 1958
3 Claims. (Cl. 150—52)

The present invention relates to camera carrying cases of the kind known as ever-ready cases in which the camera mechanism is exposed for use by removing a cap and a flap covering an opening in the front wall of the case.

It is common practice to secure the upper end of the flap to the cap and the lower end of the flap to the body of the case so that the cap, when it is removed, is suspended by the flap beneath the case. This arrangement has the disadvantage that when the camera is used on its side, the flap and cap may fall across the camera objective at the instant that the shutter release is actuated thereby spoiling the exposure.

It is an object of the present invention to provide an ever-ready camera case of improved construction whereby this disadvantage is obviated.

In accordance with the present invention, an ever-ready camera case comprises a body portion for receiving a camera, a cap for closing the top of the case and a flap which is secured to the cap and, in the operative position, covers an opening in the front wall of the body portion, the cap being pivotally and slidably connected to the body portion for movement from a position in which it closes the top of the body portion to a reversed position in which it fits on the bottom of the body portion with the flap adjacent to the back wall of the body portion.

According to one form of the invention, the cap is pivotally and slidably connected to the body portion by means of a pair of arms each of which is fixed at one end to the cap and at its other end carries a stud, the head of which rides in a guide member secured to the body portion.

In order that the invention may be readily understood, one form thereof will now be described by way of example with reference to the accompanying drawings, in which:

FIG. 1 is a front perspective view of an ever-ready camera case constructed in accordance with one form of the invention;

FIG. 2 is a view similar to FIG. 1 but with the cap and front flap in the inoperative position to expose the camera mechanism for use;

FIG. 3 is a vertical section through FIG. 1;

FIG. 4 is a side elevation of FIG. 1 with the cap raised off the top of the body portion;

FIG. 5 is a side elevation of FIG. 2; and

FIGS. 6 and 7 show the carrying case including a camera and show the case partially opened and fully opened, respectively.

As illustrated, the camera case comprises a body portion having a rear wall 1 and curved side walls 2 and 3 which extend partially across the front of the case but have their edges spaced apart to leave an opening 4 therebetween. The case is provided with a bottom wall 5 and a cap 6 to which is attached a front flap 7, such as by sitching or by riveting. Press stud elements 8 and 9 are provided on the flap 7 and the extensions of the side walls 2 and 3 for the purpose of securing the flap over the opening 4.

The cap 6 has riveted thereto one end of each of a pair of arms 10, each of which carries at its other end a stud 11 in engagement with one of a pair of guide members 12 secured, such as by riveting to the side walls 2 and 3 of the case. Each guide member is formed with a slot 13 which is undercut to receive the head of the stud 11, as shown in FIG. 3, so as to allow sliding and pivotal movement of the cap 6 relative to the body portion. Preferably the arms 10, studs 11 and guide members 12 are made from a plastic material such as nylon.

Assuming that a camera is enclosed in the case, as shown in FIG. 1, and it is required to take a photograph, the press stud elements 8 and 9 are separated and the cap 6 of the case is pulled upwardly to separate it from the body as shown in FIG. 4. The cap 6 and flap 7 may then be turned about the body of the case, see FIG. 6, by reason of the pivotal action of the studs 11 in the slots 13 of the guide members 12 as shown in dot chain lines in FIG. 4. When the cap 6 has been turned to a position in which it is disposed beneath the body of the case (as shown in FIG. 5) it is pressed upwardly until it fits on the bottom of the case as shown in FIGS. 2 and 7. In this position the flap 7 lies against the rear wall 1 of the body to expose the camera objective.

In order to close the case, the cap is pulled clear of the bottom of the case and is pivoted upwardly until it is above the top of the case and may be pressed down thereon.

As illustrated, the case is provided with the usual carrying strap 14 which is connected to the rear wall 1 such as by means of a pair of rings 15 fastened to the rear wall of the case. The flap 7 may be provided with a window 16 which, in the picture taking position of the flap, coincides with a window 17 in the rear wall 1 of the case so that the operator may see the exposure numbers on the film enclosed in the camera without removing the camera from the case. Obviously it is not necessary to include these windows if the camera is of the type having an exposure counter mounted on the top wall thereof.

Having thus described our invention, what we claim is new and desire to secure by Letters Patent of the United States is:

1. A camera carrying case comprising a body portion adapted to confine a camera and including an open top to permit a camera to be inserted into, and removed therefrom; a closed bottom of substantially the same size and configuration as the top; a back wall; a front wall provided with an opening with which the camera objective will be aligned when a camera is situated in said body portion; side walls joining said front and back walls; a cap for closing the top of said body portion; a flap secured to the front edge of said cap; and means for pivotally and slidably connecting said cap to said body portion to permit movement of said cap between an operative position, wherein it closes the top of said body portion of the flap secured thereto covers said opening in the front wall, and an inoperative position, wherein it fits onto the bottom with said flap disposed adjacent the back wall of the body portion, said last mentioned connecting means comprising a pair of arms each of which is fastened at one end to the outer face of opposite ends of said cap, a slotted guide members fixed to and extending vertically of the outside of each side wall of said body portion, and a headed stud fixed to the other end of each of said arms and slidably retained in opposite ones of said guide members.

2. A camera carrying case comprising a body portion adapted to confine a camera and including an open top to permit a camerta to be inserted into and removed from said body portion; a closed bottom of substantially the same size and configuration as said top; a back wall; a front wall provided with an opening with which the camera objective will be aligned when a camera is situated in said body portion; side walls joining said back and front walls; a cap of such size and configuration as to telescope onto the open top of said body portion and onto said bottom; a flap secured to one edge of said cap; and means connecting said cap to said body portion to permit movement of said cap between an operative position, wherein it is slid onto the open end of said body portion and said flap covers the opening in said front wall, and an inoperative position, wherein said cap is slid onto said bottom wall and said flap lies adjacent said back wall, and comprising at least one pair of rigid members, one of which is fixed to said body portion and the other of which is fixed to said cap; and means pivotally and slidably connecting said rigid members together whereby said cap may be swung about said body portion between a position directly above and a position directly below said body portion and from each of which positions it can be slid to said operative and inoperative positions, respectively.

3. A camera carrying case according to claim 2, including cooperating latch means on said flap and said front wall for releasably holding said cap and the flap associated therewith in said operative position.

References Cited in the file of this patent

UNITED STATES PATENTS

| | | |
|---|---|---|
| 1,693,151 | Mayer | Nov. 27, 1928 |
| 2,485,837 | Nadelson | Oct. 25, 1949 |
| 2,634,661 | Roth | Apr. 14, 1953 |
| 2,897,034 | Kalen | July 28, 1959 |
| 2,938,441 | Klingenstein | May 31, 1960 |

FOREIGN PATENTS

| | | |
|---|---|---|
| 817,075 | Germany | Oct. 15, 1951 |
| 747,159 | France | Mar. 21, 1933 |
| 34,397 | France | Jan. 2, 1929 |

UNITED STATES PATENT OFFICE

CERTIFICATE OF CORRECTION

Patent No. 3,033,258             May 8, 1962

Graham Helary Pollard et al.

It is hereby certified that error appears in the above numbered patent requiring correction and that the said Letters Patent should read as corrected below.

Column 2, line 50, for "of", second occurrence, read -- and --; line 57, for "members" read -- member --; same column 2, line 63, for "camerta" read -- camera --.

Signed and sealed this 11th day of September 1962.

(SEAL)
Attest:

ERNEST W. SWIDER            DAVID L. LADD
Attesting Officer             Commissioner of Patents